United States Patent [19]

Simoudis

[11] 3,755,887

[45] Sept. 4, 1973

[54] METHOD OF MAKING COBALT ALLOY STEEL COMPOSITE ARTICLE

[75] Inventor: John C. Simoudis, Justice, Ill.

[73] Assignee: Continental Can Company, New York, N.Y.

[22] Filed: Nov. 12, 1971

[21] Appl. No.: 198,269

[52] U.S. Cl. .................. 29/498, 29/196.6, 29/504
[51] Int. Cl. ..................... B23k 31/02, B23k 35/24
[58] Field of Search ................. 29/196.6, 498, 504

[56] References Cited
UNITED STATES PATENTS

| | | | |
|---|---|---|---|
| 1,998,496 | 4/1935 | Fiedler | 29/196.6 UX |
| 2,987,817 | 6/1961 | Kozlik | 29/494 |
| 3,065,535 | 11/1962 | Crehan et al. | 29/484 |
| 3,634,048 | 1/1972 | Koops et al. | 29/196.6 |
| 3,649,225 | 3/1972 | Simmons, Jr. | 29/196.6 X |
| 3,674,447 | 7/1972 | Bellis | 29/196.6 |
| 3,693,245 | 9/1972 | de Cadenet | 29/504 |

OTHER PUBLICATIONS

Metals Handbook, 8th Edition, Taylor Lyman editor; Vol. 1, American Society for Metals, 2/1962, group 320 technical literature, pp. 54–55.

Primary Examiner—J. Spencer Overholser
Assistant Examiner—Ronald J. Shore
Attorney—Paul Shapiro et al.

[57] ABSTRACT

A method is provided for preparing a cobalt alloy-steel composite article wherein the alloy body is bonded to the steel body with a weld material having a low yield strength, the steel having a coefficient of thermal expansion greater than the cobalt alloy; the weld material, when cooled from the maximum temperature to which the composite article is heated during welding, undergoing a contraction no less than the construction of the cobalt alloy and no greater than the contraction of the steel.

7 Claims, No Drawings 3,755,887

METHOD OF MAKING COBALT ALLOY STEEL COMPOSITE ARTICLE

BACKGROUND OF THE INVENTION

1. Field of the Invention

This invention relates to a composite wear resistant metal article and more particularly relates to a procedure for bonding wear resistant cobalt alloy metal pieces to a steel core supporting member.

2. Prior Art

In the manufacture of metal cans, the end closures are conventionally secured to the upper ends of the can body by means of a double seam. In the double seaming operation, the end closure is applied to the upper end of the can body and is engaged against a rotatably driven seaming chuck. Seaming rolls are then actuated and engaged with the flange portions of the end closure and the can body to form the double seam.

In the double seaming operation, the seaming chucks are used at speeds in the order of 100 cans per chuck per minute. During the operation, the lip of the seaming chuck is subjected to thermal fatigue and severe wear.

Due to their properties of high micro-structural hardness and high wear and corrosion resistance, cobalt alloys are particularly suitable for use in the manufacture of seaming chucks. Seaming chucks machined from cobalt-chromium alloys for example, will exhibit an operating life in the order to three to four million cans per chuck at a seaming rate of 1000 cans per minute. Cobalt-chromium alloys are commercially available in the form of solid round cast slugs having a Rockwell "C" hardness of 40-55. Due to the hardness of the cobalt-chromium alloy, however, machining of seaming chucks from the solid slugs is very difficult and threads can be formed only with great difficulty. For these reasons, the cost of cobalt alloy seaming chucks is presently uneconomical for use in commercial double seaming operations.

The cost of the cobalt alloy seaming chuck can be considerably reduced by a composite assembly consisting of a core of an easily machinable steel material and an outer ring of the cobalt alloy attached at its inner periphery to the outer periphery of the steel core.

Up to the present time, considerable difficulties have been encountered welding cobalt alloy rings to steel cores because of the difference in the coefficient of thermal contraction between the two materials. Thus, cobalt-chromium alloys have a coefficient of thermal expansion of about $7 \times 10^{-6}$ in/in/°F, whereas the coefficient of thermal expansion of most steels is approximately $6 \times 10^{-6}$ in/in/°F. Because of this difference in coefficient of thermal expansion between the steel and cobalt alloy when the two metals are welded to form a composite material, tensile stresses are imparted to the cobalt-chromium alloy ring upon cooling. Thus, for example, if a cobalt-chromium alloy ring is welded onto a steel core, as the assembly cools, due the greater coefficient of thermal expansion of the cobalt-chromium alloy, the cobalt alloy ring shrinks to a greater extent than the steel core. As a result, severe tensile stresses are developed in the cobalt ring causing cracking of the cobalt ring or the weld or otherwise accelerating the fatigue failure of the cobalt ring in service.

When the steel core is welded to the cobalt alloy ring, as the weld material cools and solidifies from the molten state and bonds to the cobalt ring and steel core, heat is absorbed by the cobalt and steel causing them to expand. This expansion is generally greater in the cobalt alloy ring than in the steel core and causes cracking of the weld material. Further, a constraining force is imposed by the solid cobalt alloy ring and steel core on the weld material as the weld material cooling from a molten state contracts to a greater degree than either the solid cobalt alloy ring or the steel core. The constraining force imposed by the cobalt alloy ring and steel core imparts severe hoop stresses to the solidified weld material which will cause the weld material to crack either upon cooling or after limited service.

SUMMARY OF THE INVENTION

In accordance with the present invention there is provided a method for preparing a composite article of a cobalt alloy body and a steel body in which the cobalt alloy body forms the external wearing surface of the article wherein an assembly of a preformed body of the cobalt alloy and a preformed body of the steel is prepared, the steel having a coefficient of thermal expansion greater than the cobalt alloy. A molten weld material having a low yield strength is interposed between the cobalt alloy body and the steel body causing the assembly to be heated to a maximum elevated or equilibrium temperature, the weld material when cooling from the equilibrium temperature undergoing a contraction no less than the contraction of the cobalt alloy body and no greater than the contraction of the steel body. The heated assembly is then allowed to cool from the equilibrium temperature whereby solidification of the weld material occurs. Solidification of the welding material effects bonding of the cobalt alloy body to the steel body to form the composite article.

By the method of the present invention the deleterious effects set up by differential coefficient of thermal contraction of the cobalt alloy and steel are minimized. When the composite assembly of the present invention is heated to the equilibrium temperature by the imposition of the molten weld material, the expansion of the heated cobalt body and steel body subjects the weld material to a non-destructive compressive radial pressure. The selection of a steel body having a coefficient of thermal expansion greater than the cobalt alloy results in the steel body upon cooling from the equilibrium temperature being placed in tension rather than the cobalt alloy body. The steel body is generally capable of undergoing high elongation at stress levels that are far below the compressive yield strength of the cobalt alloy ring and cracking of the steel body is thereby avoided. The external cobalt alloy body having a coefficient of thermal expansion less than the steel body will upon cooling from the equilibrium temperature be placed in compression rather than tension. As the tensile stresses will be imparted to the internal steel body portion of the composite article rather than the external wear surfaces, substantially increased service life of the composite article results.

As the weld material upon cooling from the equilibrium temperature undergoes a total contraction no less than the contraction of the cobalt alloy and no greater than the contraction of the steel body, and since the weld material because of its low yield strength is capable of high elongation at low stress levels, the hoop stresses normally imparted to the weld by the cooled cobalt alloy body are small, thereby eliminating weld cracking after cooling or during service of the composite article. As the weld material undergoes a contraction no less than the cobalt alloy body, no tensile stresses are imposed on the cobalt alloy body.

PREFERRED EMBODIMENTS

The cobalt alloys used in the practice of the present invention are cobalt alloys having a major proportion of chromium e.g. 22 to 32 percent. One example of a commercially available cobalt-chromium alloy useful in the practice of the present invention is Stoody No. 6 alloy produced by the Stoody Company, Whittier, California. A typical composition of such alloy is as follows:

Carbon    1.0 – 1.6 percent
Tungsten    4.0 – 6.0 percent
Manganese    0.50 percent maximum
Iron    2.0 percent maximum
Silicon    0.8 – 1.5 percent
Chromium    26.0 – 29.0 percent
The remainder is cobalt.

Cobalt alloys of this type have a coefficient of thermal expansion of about $7.0 \times 10^{-6}$ in/in/°F.

The cobalt alloy undergoes a varying amount of contraction depending upon the temperature from which it is cooled. Typical contraction of the alloy when cooled from an elevated temperature ($T_e$) to room temperature in an air atmosphere is summarized in the table below.

| $(T_e)$°F | Cobalt Alloy Contraction (inches per inch of alloy length) |
|---|---|
| 1000 | 7.02 |
| 900 | 6.25 |
| 800 | 6.88 |
| 700 | 6.72 |

Steel compositions which are useful as core materials in preparing the composite articles of the present invention are steel alloys having a coefficient of thermal expansion greater than $7 \times 10^{-6}$ in/in/°F. Steel compositions having a coefficient of thermal expansion greater than $7 \times 10^{-6}$ in/in/°F include the austenitic stainless steels such as 304 stainless steel which has a coefficient of thermal expansion of about $10 \times 10^{-6}$ in/in/°F.

A typical composition of this steel is as follows:

| Carbon | 0.08 maximum |
|---|---|
| Nickel | 9.0 – 12.0% |
| Chromium | 18 – 21% |
| Maganese | 1.5% maximum |
| Molybdenum | 2 – 3% |
| Silicon | 1.5% maximum |
| Phosphorous | 0.04% maximum |
| Sulfur | 0.04% maximum |

The remainder is iron.

The composition used for welding the cobalt alloy and steel core is material having a low yield strength which exhibits a contraction from the equilibrium temperature equal to or greater than that of the cobalt alloy and equal to or less than that of the steel core. Materials which meet these requirements of the present invention include the 300 series austenitic stainless steels such as 304 stainless steel and nickel base alloys such as Monel which contains as its major constituents 64 percent nickel, 31.5 percent copper and 0.2 percent carbon. These materials exhibit elongations that are above 10 percent, generally in the range of 10 to 50 percent and have yield strengths in tension in the order of 30,000 to 100,000 pounds per square inch which are 30 to 60 percent of the compressive yield strength of a cobalt alloy such as cobalt-chromium alloys.

These weld materials undergo varying degrees of contraction depending upon the temperature from which they are cooled. Typical contraction of these weld materials when cooled from an elevated temperature to room temperature in an air atmosphere is summarized in the Table below:

| $(T_e)$ °F | Weld Contraction (inch/inch of weld length) | |
|---|---|---|
| | 304 | Monel |
| 1000 | 10.22 | 9.10 |
| 900 | 10.08 | 8.97 |
| 700 | 10.00 | 8.88 |

In preparing the cobalt alloy/steel composite article in accordance with the method the present invention, the steel core is placed in the opening of a ring or annulus formed from a cobalt alloy, the ring opening having a greater diameter than the diameter of the steel core. The cobalt alloy ring is generally about two to 10 times the thickness of the weld material and is generally two to five times greater than the thickness of the steel core.

The cobalt alloy ring is welded to the steel core member with a welding material of the type previously discussed in any manner known to the art. Generally in welding, the cobalt alloy ring and steel core member are cleaned and positioned in a welding fixture. A rod or strip of welding material is placed between the faces of the cobalt alloy ring opening and the steel core. The temperature of the welding material is raised to above its melting point to a molten state flows and fills the clearance spacing between the ring opening and steel core. The welding operation is generally conducted in a vacuum or an inert atmosphere containing helium or other inert gas to prevent oxidation and contamination of the weld.

The temperature employed in the welding operation is maintained substantially below the melting range of the cobalt ring or steel core in order to avoid damage to the steel core and cobalt alloy ring. In other words, the welding operation is accomplished in such a manner as to retain the cobalt alloy and steel core in an unmelted condition so that they will substantially fully retain their initial characteristics for utilization in the final composite product.

The temperature range when welding in accordance with the process of the present invention is generally in the range of 2300°F to 2800°F. The heating of the welding material can be accomplished by conventional electric or gas torch welding type operation. Heating of the welding material is continued for a time sufficient for a continuous layer of welding metal to form between the opposing faces of the cobalt alloy ring member and the steel core member. When the desired continuous layer of molten welding metal has been formed, the assembly is cooled to room temperature in an air atmosphere. At welding temperatures of 2300° to 2800°F, the maximum or equilibrium temperature reached by the composite article as a result of the heat transmitted to the article by the molten weld material is generally about 300° to 1000°F, depending upon the thickness of the weld material portion of the composite article. Generally, the width of the weld material in the composite article will range from ⅛ to ½ of the width of the cobalt alloy ring.

After cooling, the composite article is removed from the fixture and ground to final dimensions and finish. A screw thread may thereafter be easily cut in the steel core whereby the composite article may be connected to seaming or other operational equipment.

The cobalt alloy/steel composite article thus produced has an accurate shape, as based upon the preformed shaping of the cobalt alloy and steel core and has wear and service life properties at least equal to articles prepared from the cobalt alloy alone.

To illustrate the manner in which the invention may be carried out, the following example is given. It is to be understood however, that the example is for the purpose of illustration, and the invention is not to be limited to any of the specific materials or conditions recited therein.

EXAMPLE

An assembly consisting of an external ring of Stoody No. 6 cobalt-chromium alloy having an outside diameter of 3.0 inches, an inside diameter of 2.07 inches and a thickness of 0.53 inches and an inner solid core of 304 stainless steel having an outside diameter of 2.0 inches and a thickness of 0.24 inches was placed in a welding fixture. A 0.21 inch thick annulus of 304 stainless steel was interposed between the cobalt alloy ring and steel core and heated to about 2500°F. The temperature of the assembly was raised to about 700°F by the welding operation.

The assembly was allowed to cool to room temperature in the welding fixture.

After cooling, the assembly was removed from the fixture and ground to final dimensions. Screw threads were machined in the steel core. No cracks were observed in the weld area of the composite article. The hoop stress in the cobalt alloy ring portion of the composite article was measured to be approximately 50,000 pounds per square inch in compression.

A seaming chuck machined from the composite article exhibited a service life of seven million cans per chuck.

By way of contrast, the welding procedure of the example was repeated with the exception that the inner steel core was made from 440C stainless steel and the welding alloy annulus employed was that of a cobalt-chromium alloy. The 440C stainless steel has a total contraction when cooled from the equilibrium temperature lower than the cobalt alloy. When the welded assembly was examined after cooling, it was found that the weld was cracked and that the cobalt alloy was stressed in tension.

By way of further contrast, the procedure of the example was repeated except a 304 stainless steel core was welded to the cobalt alloy ring using 17-4PH precipitation hardening stainless steel. The 17-4PH stainless steel exhibits a total contraction when cooled from the equilibrium temperature less than the cobalt alloy. Inspection of the welded assembly after cooling revealed that the weld was cracked.

What is claimed is:

1. A method for preparing a composite article of a cobalt alloy body and a steel body in which the cobalt alloy body forms the external wearing surface of the article which comprises:

preparing an assembly of the cobalt alloy body and the steel body, the steel having a coefficient of thermal expansion greater than the cobalt alloy, interposing a molten weld material between the cobalt body and the steel body causing the assembly to be heated to a maximum equilibrium temperature, cooling the assembly from the equilibrium temperature, the weld material during the cooling undergoing a contraction no less than the contraction of the cobalt alloy bdoy and no greater than the contraction of the steel body.

2. The method of claim 1 wherein the cobalt alloy contains 22 to 32 percent chromium.

3. The method of claim 1 wherein the steel body is formed from an austenitic stainless steel.

4. The method of claim 1 wherein the weld material is an austenitic stainless steel.

5. The method of claim 1 wherein the weld material is a nickel base alloy.

6. The method of claim 1 wherein the weld material is composed of the same composition as the steel body.

7. The method of claim 1 wherein the equilibrium temperature is about 300° to 700°F.

* * * * *